Oct. 27, 1936. O. P. McCARTY Re. 20,147
TRANSFORMER TAP CHANGING MECHANISM
Original Filed Nov. 29, 1933
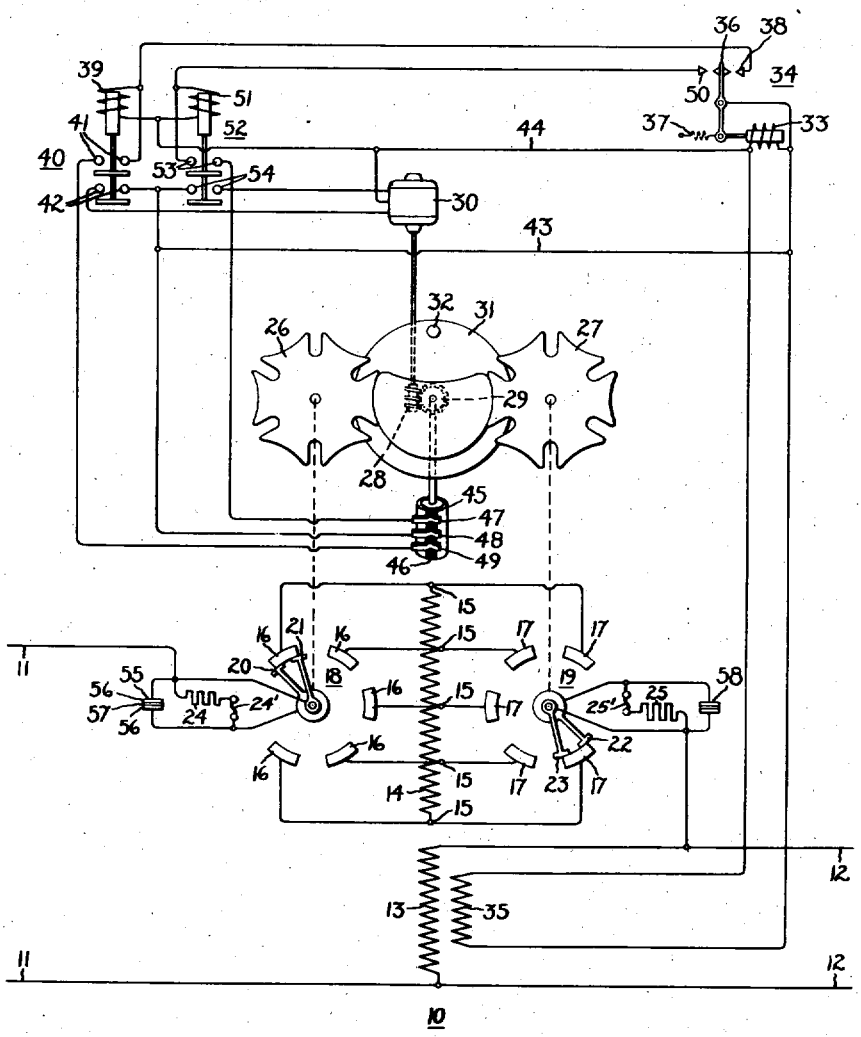
Inventor:
Orin P. McCarty,
by Harry E. Dunham
His Attorney.

Reissued Oct. 27, 1936

Re. 20,147

UNITED STATES PATENT OFFICE 20,147

TRANSFORMER TAP CHANGING MECHANISM

Orin P. McCarty, Pittsfield, Mass., assignor to General Electric Company, a corporation of New York Original No. 2,004,998, dated June 18, 1935, Serial No. 700,239, November 29, 1933. Application for reissue October 30, 1935, Serial No. 47,430

10 Claims. (Cl. 171—119)

My invention relates to transformer tap changing mechanisms and to protective circuits particularly adapted for use therein. Varying conditions in the circuits connected to a transformer often make it desirable to change the ratio of voltage transformation in the transformer without interrupting its load and the general object of the invention is to provide improved and reliable mechanism for this purpose. A further object of the invention is to provide a protective circuit to prevent damage to the mechanism in case of faulty operation thereof.

The invention will be more fully explained in the following description taken in connection with the accompanying drawing which shows diagrammatically an auto transformer provided with voltage ratio adjusting means arranged in accordance with the invention.

The transformer 10 indicated in the drawing is connected between a high voltage circuit 11 and a low voltage circuit 12, the transformer winding having a common section 13 and a series section 14. The series winding section 14 is provided with taps 15 distributed along it and connected to the fixed contacts 16 and 17 of two switches 18 and 19 respectively. The switch 18 has two movable contacts 20 and 21 fixed to a common shaft but angularly displaced and insulated from each other. The switch 19 has two similarly arranged insulated and angularly displaced movable contacts 22 and 23.

One side of the high voltage circuit 11 is connected directly to the movable contact 21 and through an impedance 24 and a fuse 24' or other circuit interrupting device to the movable contact 20 of the switch 18. Any form of impedance 24 desired may be used and it is shown in the drawing as a simple, non-inductive resistance. One side of the low voltage circuit 12 and the inner end of the common winding section 13 are connected directly to the movable contact 23 and through a resistance 25 and a fuse 25' or other circuit interrupting device to the movable contact 22 of the switch 19. The two movable contacts of each of the switches 18 and 19 are normally positioned on the same fixed contact 16 or 17 respectively. It will be apparent that any desired number of turns of the series winding section 14 may be connected by means of the switches 18 and 19 in either direction in series with the common winding section 13. Thus, up to the maximum number of turns in the series winding section 14, any number of turns desired may be connected in either direction in series with the common winding section 13. With the switches in the positions shown in the drawing the entire series winding section 14 is connected in series with the common winding section 13.

The two sets of movable contacts of the two switches 18 and 19 are operated by the two gears 26 and 27 of a double Geneva gear driven through a worm 28 and pinion 29 by a reversible motor 30. The driving element 31 of the double Geneva gear has a single driving pin 32 so arranged that one half revolution of the driving element 31 will rotate one or the other of the gear wheels 26 and 27 to change the voltage ratio of the transformer.

The coil 33 of a contact-making voltmeter 34 is connected to an auxiliary winding 35 inductively coupled to the common winding section 13 of the transformer 10. The movable contact 36 of the voltmeter is biased by a spring 37 to hold it in neutral position under the normal desired voltage conditions in the low voltage circuit 12 which will be considered as the secondary or load circuit, the circuit 11 being the primary circuit.

Now, if the voltage of the circuit 12 drops, the movable contact 36 of the voltmeter 34 will be pulled against the back contact 38 and close a circuit which may be traced from one terminal of the winding 35 through the back contact 38 of the voltmeter, the winding 39 of a relay 40 and back to the other terminal of the winding 35. This will cause the relay 40 to close two sets of contacts 41 and 42. Closing the contacts 42 completes a circuit which may be traced from one terminal of the winding 35 through a conductor 43, the contacts 42, one side of the motor 30 and back through a conductor 44 to the other terminal of the winding 35. Current from the winding 35 will then start the motor in a direction to operate the switches 18 and 19 to raise the voltage of the circuit 12.

A drum contactor 45 fixed to the shaft of the driving member 31 of the Geneva gear has a narrow section of insulation 46 upon which normally rest three brushes 47, 48 and 49. The remainder of the drum contactor 45 is conductive. As soon as the motor starts, the three brushes 47, 48 and 49 are short circuited by the contactor 45. The short circuited brushes 48 and 49 and the contacts 41 of the relay 40 which were closed by the voltmeter 34 complete a holding circuit which may be traced from one terminal of the winding 35 through the conductor 43, the brushes 48 and 49, the contacts 41, the winding 39 of the relay 40, and the conductor 44 back to the other terminal of the winding 35. This holding circuit keeps the contacts 41 closed and thus assures a complete cycle of operation of the switches even though the voltmeter contacts 36 and 38 should break the circuit before completion of the cycle. The contactor 45 rotates with the driving member 31 of the Geneva gear so that the insulating section 46 of the contactor is brought under the contacts 47, 48 and 49 at the end of each operating cycle of the Geneva gear and therefore of the switches 18 and 19. This breaks the holding circuit through the contacts 41 and returns control of the relay 39 to the contact making volt meter 34. If the change in position of the switch has adjusted the voltage of the transformer to its normal value, then the contacts 36 and 38 of the contact making volt meter will open, the relay 39 will be released to open its contacts 42 and the motor 30 will stop. If the transformer voltage is still below its normal value, then the contacts 36 and 38 of the volt meter 34 will still be closed and maintain current in the relay 39 to start another switch operating cycle. Thus the switches 18 and 19 cannot stop in any intermediate position but must complete each operating cycle after it is once started.

If the voltage of the circuit 12 rises, the movable contact 36 of the voltmeter 34 will be moved against the front contact 50 of the voltmeter to close a circuit which may be traced from one terminal of the winding 35 through the contacts 36 and 50 of the voltmeter, the winding 51 of a relay 52 and the conductor 44 back to the other terminal of the winding 35. This will cause the two sets of contacts 53 and 54 of the relay 52 to close with the result that the switches 18 and 19 will be operated in a direction to raise the voltage of the circuit 12, the contacts 54 controlling the motor 30 and the contacts 53 controlling a holding circuit through the winding 51 of the relay 52 to assure the completion of each cycle of operation of the switches 18 and 19. This operation is similar to that which has been described in connection with the relay 40 for raising the voltage of the circuit 12 and it will be easily understood without further description.

The two movable contacts of each of the switches 18 and 19 are moved very quickly from one fixed contact to the next by means of the Geneva gear drive. Referring to the switch 18, its two movable contacts 20 and 21 are normally positioned on the same fixed contact 16. After a slight motion, however, the movable contact 21 leaves this fixed contact 16 and until it reaches the next contact 16 all of the primary current will flow through the resistance 24 with its fuse 24' and the movable contact 20. After the movable contact 21 reaches the next fixed contact 16, the resistance 24 and its fuse 24' will be bridged across the two contacts 16 and will carry a circulating current due to the voltage between the transformer taps 15 to which the two contacts 16 are connected. An instant later the movable contact 20 will leave the first contact 16 and then all of the primary current of the transformer may flow directly through the movable contact 21.

Under normal conditions there is very little or no current flowing through the resistance 24 and its fuse 24' except for a very brief instant while the movable contact 21 of the switch is moving between two fixed contacts 16. In case of accidental breakage or faulty operation of some part of the switch operating mechanism, however, it is possible that the switch might stop with its movable contact 21 between two fixed contacts 16. Under this condition the resistance 24, if not protected, would have to be large enough to carry the full primary current indefinitely or its destruction would be almost certain. This would mean that the primary circuit and therefore the supply of electrical energy to the load circuit would be interrupted. It is usually highly important that the supply of energy to a commercial load on a transformer be reliable and not subject to any interruption not absolutely necessary. It would, however, be very expensive to provide the resistance 24 of such capacity as to carry the entire primary current indefinitely. In accordance with the invention, the resistance 24 is provided with a fuse 24' or other circuit interrupter and a cutout 55 is connected across the terminals of the resistance and fuse. This cutout may be of any suitable construction but it is indicated in the drawing as including two conductive plates 56 connected to the two terminals of the series connected resistance and fuse and separated by an insulating film 57 which will break down under a predetermined voltage across the cutout and thus short circuit the resistance and fuse. The cutout 55 is designed to withstand the voltage across the resistance and fuse during the very brief instant while the resistance is carrying full primary current under normal switch operating conditions. If this full primary current continues to flow through the resistance, however, due to faulty operation of the switch, the fuse 24' will blow as a result of the $I^2R$ heating effect of the current and protect the resistance. The film 57 will then instantly break down and permit the current to flow and the load circuit to be supplied with energy without interruption.

A cutout 58 is similarly connected across the resistance 25 and fuse 25' or other circuit interrupter associated with the movable contacts 22 and 23 of the switch 19. The purpose and function of this cutout 58 and fuse 25' are the same as has been already described in connection with the cutout 55 and fuse 24' and will be clearly understood without further description.

The invention provides an inexpensive but effective arrangement for assuring continuity of service in electrical circuits having impedances subject to brief or intermittent loads.

The invention has been explained by describing and illustrating its application in connection with a particular form of transformer and control mechanism but it will be obvious that it may be otherwise applied without departing from the spirit of the invention and the scope of the appended claims.

What I claim as new and desire to secure by Letters Patent of the United States, is:—

1. The combination with a transformer winding provided with taps, of a switch having fixed contacts connected to said taps and two contacts insulated from each other and movable along said fixed contacts, means for moving said movable contacts alternately from one fixed contact to another, an impedance and a circuit interrupter connected in series between said movable contacts, and a normally open cutout connected in parallel with said impedance and interrupter, said circuit interrupter being responsive after a predetermined interval of time to open the circuit through said switch, whereby substantially full circuit voltage is impressed across said cutout, and said cutout being responsive to said voltage to close said circuit.

2. The combination with a transformer winding provided with taps, of a switch having fixed contacts connected to said taps and two angularly displaced contacts insulated from each other and movable along said fixed contacts, an impedance and a circuit interrupter connected in series between said movable contacts, and a normally open cutout connected in parallel with said impedance and interrupter, said circuit interrupter being responsive after a predetermined interval of time to open the circuit through said switch, whereby substantially full circuit voltage is impressed across said cutout, and said cutout being responsive to said voltage to close said circuit.

3. The combination with a transformer winding provided with taps, of a switch having fixed contacts connected to said taps and two contacts insulated from each other and movable along said fixed contacts, means for moving said movable contacts alternately from one fixed contact to another, an impedance and a circuit interrupter connected in series between said movable contacts and having substantially smaller current carrying capacity than that due to maximum normal transformer load, and a normally open cutout connected in parallel with said impedance and interrupter, whereby substantially full circuit voltage is impressed upon said cutout upon operation of said circuit interrupter, said cutout being responsive to said circuit voltage to break down and short circuit the two movable contacts.

4. In an alternating current circuit, an impedance, a circuit interrupting means in series with said impedance, and a normally open cutout connected in parallel with said impedance and circuit interrupting means, said circuit interrupting means being responsive after a predetermined interval of time to open said circuit, whereby substantially full circuit voltage is impressed across said cutout, and said cutout being responsive to said voltage to close said circuit.

5. The combination with an impedance for carrying the current during the operation of a transformer tap changer under load, of protective means for short circuiting the current path through said impedance, said protective means being actuated in response to the $I^2R$ heating effect of a current greater than a predetermined amount flowing through said impedance for longer than a given time.

6. The combination with an impedance for carrying the main current during the operation of a transformer tap changer under load, of protective means for short circuiting the current path through said impedance, said protective means being controlled by a fusible element actuated in response to the $I^2R$ heating effect of a current greater than a predetermined amount flowing through said impedance for longer than a given time.

7. In combination, a transformer having a winding provided with taps, a switch having fixed contacts connected to said taps and having a movable contact for selectively engaging said fixed contacts so as to vary the ratio of said transformer under load, automatic means for operating said movable contact, said means being subject to stopping said movable contact between fixed contacts, an impedance connected so as to carry the switch current when said movable contact is moving between fixed contacts, and means for protecting said impedance if said movable contact stops between fixed contacts, said protective means acting to maintain a conducting path for said switch current.

8. In combination, a transformer having a winding provided with taps, a switch having fixed contacts connected to said taps and having a movable contact for selectively engaging said fixed contacts so as to vary the ratio of said transformer under load, automatic means for operating said movable contact, said means being subject to stopping said movable contact between fixed contacts, an impedance connected so as to carry the switch current when said movable contact is moving between fixed contacts, and means for short circuiting the current path through said impedance when said movable contact stops between fixed contacts.

9. In combination, a transformer having a winding provided with taps, a switch having fixed contacts connected to said taps and having a movable contact for selectively engaging said fixed contacts so as to vary the ratio of said transformer, an impedance connected so as to carry the switch current when said movable contact is moving between fixed contacts, normally nonconducting means for bypassing said impedance, and means connected in series with said impedance for controlling the operation of said bypassing means.

10. In combination, an electric circuit, a transformer connected in said circuit and having a winding provided with taps, a switch having fixed contacts connected to said taps and having a movable contact for selectively engaging said fixed contacts so as to vary the ratio of said transformer, means responsive to variations in the voltage of said circuit from a predetermined value for controlling the operation of said movable contact, an impedance connected so as to carry the current when said movable contact is moving between fixed contacts, normally nonconductive means for bypassing said impedance, and fusible means connected in series with said impedance for controlling the operation of said bypassing means.

ORIN P. McCARTY.